(12) United States Patent
Grinenval (10) Patent No.: US 9,862,383 B2
(45) Date of Patent: Jan. 9, 2018

(54) METHOD FOR OPERATING A VEHICLE BASED ON ONE OR MORE SETPOINT TRAJECTORIES

(71) Applicant: Robert Bosch GmbH, Stuttgart (DE)

(72) Inventor: Charlotte Grinenval, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/111,474

(22) PCT Filed: Dec. 2, 2014

(86) PCT No.: PCT/EP2014/076265
§ 371 (c)(1),
(2) Date: Jul. 13, 2016

(87) PCT Pub. No.: WO2015/106875
PCT Pub. Date: Jul. 23, 2015

(65) Prior Publication Data
US 2016/0355185 A1    Dec. 8, 2016

(30) Foreign Application Priority Data
Jan. 16, 2014 (DE) .................... 10 2014 200 687

(51) Int. Cl.
*B60W 30/17* (2012.01)
*B60W 30/10* (2006.01)
(Continued)

(52) U.S. Cl.
CPC ........... *B60W 30/17* (2013.01); *B60W 30/10* (2013.01); *B60W 30/16* (2013.01);
(Continued)

(58) Field of Classification Search
CPC .... B60W 30/10; B60W 30/12; B60W 30/165; B60W 30/17; B60W 30/18018;
(Continued)

(56) References Cited

U.S. PATENT DOCUMENTS

| 7,487,020 B2* | 2/2009 | Iwazaki | ............ B62D 15/0285 180/204 |
| 9,081,387 B2* | 7/2015 | Bretzigheimer | .......... B60T 1/10 |

(Continued)

FOREIGN PATENT DOCUMENTS

| DE | 102012203187 A1 | 6/2012 |
| DE | 102011121487 A1 | 6/2013 |

(Continued)

OTHER PUBLICATIONS

JPO machine translation of JP 2009-241870 (original JP document published Oct. 22, 2009).*

(Continued)

*Primary Examiner* — Behrang Badii
*Assistant Examiner* — David Testardi
(74) *Attorney, Agent, or Firm* — Norton Rose Fulbright US LLP; Gerard Messina (57) ABSTRACT

A method for operating a vehicle, whereby a first setpoint trajectory is ascertained at a first point in time, based on which a setpoint trajectory of the vehicle is controlled, wherein, at a second point in time which is subsequent to the first point in time, it is checked whether or not the actual trajectory of the vehicle can continue to be controlled based on the first setpoint trajectory, and if yes, the actual trajectory of the vehicle continues to be controlled based on the first setpoint trajectory, while if no, a second setpoint trajectory is ascertained based on which the actual trajectory of the vehicle is controlled. A driver assistance system and a computer program product are also provided.

7 Claims, 7 Drawing Sheets (51) Int. Cl.
*B60W 30/16* (2012.01)
*B60W 30/18* (2012.01)
*B60W 50/06* (2006.01)

(52) U.S. Cl.
CPC ..... *B60W 30/18018* (2013.01); *B60W 30/18145* (2013.01); *B60W 2050/065* (2013.01); *B60W 2550/306* (2013.01); *B60W 2550/308* (2013.01)

(58) Field of Classification Search
CPC ..... B60W 30/18145; B60W 2550/306; B60W 2550/308
See application file for complete search history.

(56) References Cited

U.S. PATENT DOCUMENTS

| | | | | |
|---|---|---|---|---|
| 9,508,261 | B2* | 11/2016 | Rentschler | G08G 1/166 |
| 2004/0254719 | A1* | 12/2004 | Tanaka | B62D 15/027 701/532 |
| 2004/0254720 | A1* | 12/2004 | Tanaka | B62D 15/0285 701/36 |
| 2004/0267423 | A1* | 12/2004 | Iwazaki | B62D 15/0285 701/41 |
| 2005/0027414 | A1* | 2/2005 | Iwazaki | B60R 1/00 701/36 |
| 2005/0179580 | A1* | 8/2005 | Cong | B60K 31/0008 342/70 |
| 2005/0269145 | A1* | 12/2005 | Schmidt | B62D 15/0285 180/204 |
| 2007/0282499 | A1* | 12/2007 | Maeda | B60T 7/22 701/41 |
| 2009/0171533 | A1* | 7/2009 | Kataoka | B60W 30/12 701/41 |
| 2010/0082195 | A1* | 4/2010 | Lee | B62D 15/025 701/25 |
| 2010/0106418 | A1* | 4/2010 | Kindo | G08G 1/166 701/300 |
| 2010/0131142 | A1* | 5/2010 | Deng | B60T 7/18 701/65 |
| 2010/0168998 | A1* | 7/2010 | Matsunaga | B60W 30/10 701/532 |
| 2011/0231062 | A1* | 9/2011 | Kim | B62D 15/025 701/41 |
| 2013/0006473 | A1* | 1/2013 | Buerkle | B60W 30/045 701/41 |
| 2013/0317698 | A1* | 11/2013 | Yoon | B62D 15/025 701/41 |
| 2015/0066348 | A1* | 3/2015 | Baba | G08G 1/166 701/301 |
| 2015/0291162 | A1* | 10/2015 | van Nunen | G01B 21/16 702/158 |
| 2016/0052547 | A1* | 2/2016 | Kashiwai | B60W 30/10 701/41 |

FOREIGN PATENT DOCUMENTS

| | | | |
|---|---|---|---|
| EP | 1977946 A1 | * | 10/2008 |
| EP | 2388160 A1 | * | 11/2011 |
| EP | 2631147 A2 | | 8/2013 |
| JP | 2009241870 A | * | 10/2009 |
| JP | 2010202030 A | * | 9/2010 |
| JP | 2014061792 A | * | 4/2014 |
| WO | WO 2016/017636 A1 | * | 2/2016 |

OTHER PUBLICATIONS

International Search Report dated Apr. 21, 2015, of the corresponding International Application PCT/EP2014/076265 filed Dec. 2, 2014, 2 pages.

* cited by examiner

METHOD FOR OPERATING A VEHICLE BASED ON ONE OR MORE SETPOINT TRAJECTORIES

FIELD

The present invention relates to a method for operating a vehicle. In addition, the present invention relates to a computer program product as well as a driver assistance system.

BACKGROUND INFORMATION

A number of conventional driver assistance systems assist in the driving function of the vehicle as well as further functions of the vehicle like, for example, adaptive cruise control, rear-impact warning, lane-keeping assistance, night-vision camera with person recognition, parking assistance for the automatic parking of the vehicle and a lane-change assistance system for detecting a vehicle in a blind spot. Various driver assistance systems are described in the article "Zukunft der Fahrerassistenz mit neuen E/E-Architekturen" (Future of Driver Assistance with New E/E Architectures), ATZ Elektronik, April 2011, pages 8 to 15.

SUMMARY

An object of the present invention is to provide an improved method for operating a vehicle.

In addition, an object of the present invention is to provide a corresponding computer program product.

An object of the present invention is also to provide a corresponding driver assistance system.

According to one aspect of the present invention, a method is provided for operating a vehicle,
 whereby at a first point in time, a first setpoint trajectory is ascertained, based on which an actual trajectory of the vehicle is controlled, characterized in that
 at a second point in time, which is subsequent to the first point in time, it is checked whether or not the actual trajectory of the vehicle may continue to be controlled based on the first setpoint trajectory,
 if yes, the actual trajectory of the vehicle continues to be controlled based on the first setpoint trajectory,
 if no, a second setpoint trajectory is determined, based on which the actual trajectory of the vehicle is controlled.

According to another aspect, a computer program product having program code is provided to carry out the method for operating a vehicle when the computer program product is run on a processing device or is stored on a machine-readable storage medium.

According to another aspect, a driver assistance system is provided for a vehicle, the driver assistance system including a processing device which is equipped to carry out the method for operating a vehicle.

According to a further aspect, a vehicle including the driver assistance system is provided.

In particular, the present invention thus includes checking whether the first originally calculated, therefore especially in a previous cycle, setpoint trajectory may or may not continue to be used, i.e., for the instantaneous cycle, to control the actual trajectory of the vehicle. If this is the case, then the actual trajectory of the vehicle continues to be controlled based on the first setpoint trajectory. If not, a second setpoint trajectory is ascertained, based on which the actual trajectory of the vehicle is controlled.

In the related art, a second setpoint trajectory was always calculated at the second point in time. The first setpoint trajectory was discarded. Since according to the present invention, it is provided to continue to use the first setpoint trajectory as basis for controlling the actual trajectory of the vehicle contingent on the check, it is possible to save advantageously on computing time and computational work. This is especially advantageous in the case of real-time applications.

In one specific embodiment, a remaining setpoint trajectory may be ascertained which corresponds to the first setpoint trajectory minus a section of the first setpoint trajectory already used at the second point in time for controlling the actual trajectory, a driving corridor being determined at the second point in time, it being checked whether the remaining setpoint trajectory is completely within the driving corridor, and if yes, the actual trajectory of the vehicle being controlled based on the remaining setpoint trajectory, while if no, the actual trajectory of the vehicle being controlled based on the second setpoint trajectory.

In other words, expressly only the distance actually to be driven (the remaining setpoint trajectory) is thus taken into account. The distance already covered (the section which was already used for the control) is no longer considered. Generally, a driving corridor defines a surface able to be driven on, within which the vehicle is guided. Outside of the driving corridor are usually stationary obstacles, or one must expect a loss in riding comfort if the vehicle should travel outside of the driving corridor. However, so long as the remaining setpoint trajectory is within the driving corridor, the above-mentioned disadvantages may be avoided. In particular, a collision with obstacles may especially be avoided. Notably, a loss in riding comfort may advantageously be prevented.

Moreover, a noise in the driving corridor, e.g., because of a weakness in the sensor system, will bring about or generate fewer effects on the operating behavior, thus, on the control, in comparison to the known related art in which a second setpoint trajectory was always calculated at the second point in time, for according to one specific embodiment, a driving corridor is established based on at least one parameter of an environment of the vehicle, the parameter being determined with the aid of at least one sensor (for example: video sensor, laser sensor, ultrasonic sensor, radar sensor, lidar sensor). Such a sensor may exhibit noise, which may thus also lead indirectly to a noise in the driving corridor. Because of the condition that the remaining setpoint trajectory must be within the driving corridor in order that the first setpoint trajectory may continue to be used for the control, an influence of the noise is decreased or even avoided.

According to one specific embodiment, a first driving corridor may be established at the first point in time. According to one specific embodiment, the first driving corridor may be determined analogously to the driving corridor. The first setpoint trajectory is then ascertained in such a way that it is located completely within the first driving corridor. Meaning expressly that a first driving corridor is thus ascertained at the first point in time, a first setpoint trajectory being determined within the first driving corridor. For better differentiation, in the specific embodiment including a first driving corridor, the driving corridor which is determined at the second point in time may be referred to as the second driving corridor.

According to another specific embodiment, the remaining setpoint trajectory may be linked to a position of the vehicle at or after the second point in time. In particular, the remaining setpoint trajectory is linked to a direction of travel of the vehicle at or after the second point in time.

Allowance is advantageously made here for the circumstance that the vehicle may possibly have a position at the second point in time which does not lie on the first setpoint trajectory. This, for example, because of external influences, e.g., crosswinds and/or noise in a position determination. In the ideal case, the vehicle would be located or lie on the first setpoint trajectory at the second point in time. For example, the noise in the position determination may be caused because of a sensor noise. Therefore, in particular, the linking advantageously ensures that the remaining setpoint trajectory merges seamlessly or continuously, thus, without interruption, with the instantaneous actual trajectory of the vehicle, i.e., the actual trajectory existing at the instant of the linking. This advantageously prevents abrupt sudden changes in a control of the vehicle movement, for if the vehicle is off of the setpoint trajectory, as a rule, an abrupt vehicle maneuver is carried out to reach the first setpoint trajectory.

In one specific embodiment, the driving corridor may have a predetermined length, the first setpoint trajectory being described with the aid of an analytical function, so that the first remaining setpoint trajectory is extended based on the analytical function up to the lengthwise end of the driving corridor, it being checked whether or not the extended first remaining setpoint trajectory is completely within the driving corridor, and if yes, the actual trajectory of the vehicle being controlled based on the extended remaining setpoint trajectory, while if no, the actual trajectory of the vehicle being controlled based on the second setpoint trajectory.

It may occur that the originally calculated first setpoint trajectory does not extend up to the lengthwise end, which may also be referred to as a horizon, since because of a vehicle movement, the driving corridor, which indeed is usually linked to the instantaneous position of the vehicle, has shifted accordingly. The reason is that at the instant the first setpoint trajectory was calculated, the driving corridor did not yet exist, so that the first setpoint trajectory really could not be ascertained up to the horizon of the driving corridor, which is not calculated until later, namely, at the second point in time. However, since the first setpoint trajectory may be described with the aid of an analytical function, the remaining setpoint trajectory may easily be extended up to the lengthwise end or up to the horizon of the driving corridor. The actual trajectory of the vehicle may then be controlled in advantageous manner based on the extended remaining setpoint trajectory, if the extended remaining setpoint trajectory is within the driving corridor. Otherwise, the second setpoint trajectory is determined, based on which the actual trajectory of the vehicle is controlled.

For example, a horizon within the meaning of the present invention may be understood to be a sensor range (thus, how far the sensor is able to cover a surrounding field by sensory means) or optical range of a sensor (or the sensor system). In particular, a horizon may be understood to be a length, relevant from a situation analysis, specific to a longitudinal direction of the vehicle and measured starting from the vehicle at the point in time the corresponding driving corridor is ascertained. In particular, the relevant length may thus be less than a sensor range. This is especially so when a situation analysis (thus, an analysis of a presently existing situation) reveals that only a relevant length which is less than the sensor range should be used as basis for calculating the extended remaining setpoint trajectory. The remaining setpoint trajectory is thus extended to the point that it is as long as the relevant length.

In one specific embodiment, the control of the actual trajectory may include a longitudinal control of a vehicle movement and/or a lateral control of the vehicle movement.

According to another specific embodiment, in the case of a further vehicle preceding the vehicle and in the case of a longitudinal control of the vehicle movement, in order to control an actual distance to a setpoint distance between the vehicle and the further vehicle, the first setpoint trajectory may be used for the further control of the actual trajectory if a deviation of the actual distance from the setpoint distance is less, especially less than or equal to, a predetermined deviation threshold value. That is to say, particularly so long as the deviation is less, preferably less than or equal to, the deviation threshold value, the actual trajectory therefore continues to be calculated based on the first setpoint trajectory.

In particular, a driving corridor within the meaning of the present invention forms a driving task. The horizon of the driving corridor for a lateral guidance is, in particular, the length, relevant for the driving task, in the x-direction (in the direction of travel). For a longitudinal guidance, the horizon of the driving corridor especially is the time by which one or more position targets of the driving task should be reached. A driving corridor preferably contains or includes boundaries for the lateral guidance and passing points that prohibit certain areas, and a prediction of the movement of the passing points over time. For example, the driving corridor is a description of a free space with a definition of targets for a target position and a targeting in this space (the free space).

Computing time and computational work in the case of a longitudinal control may advantageously be saved here, as well. As a consequence, a noise in a distance measurement, e.g., because of a sensor weakness in the distance-measuring sensor system, does not lead to an uncomfortable longitudinal control.

According to one specific embodiment, the driver assistance system may take the form of a traffic-jam assistance system.

A traffic-jam assistance system within the meaning of the present invention assists a driver in guiding a vehicle when there is congestion or stop-and-go traffic. In particular, the traffic-jam assistance system is able to guide the vehicle in highly automated fashion, thus, without intervention by the driver, during a traffic jam or stop-and-go traffic.

Guidance within the meaning of the present invention includes especially longitudinal guidance and/or lateral guidance.

Features and functionalities for the driver assistance system are derived analogously from the specific embodiments of the method and vice versa.

BRIEF DESCRIPTION OF THE DRAWINGS

The present invention is explained in greater detail below on the basis of preferred exemplary embodiments.

DETAILED DESCRIPTION OF EXAMPLE EMBODIMENTS

Hereinafter, identical reference numerals may be used for identical features. For the sake of the overall view, all features shown do not always have a reference numeral.

Figure 1:
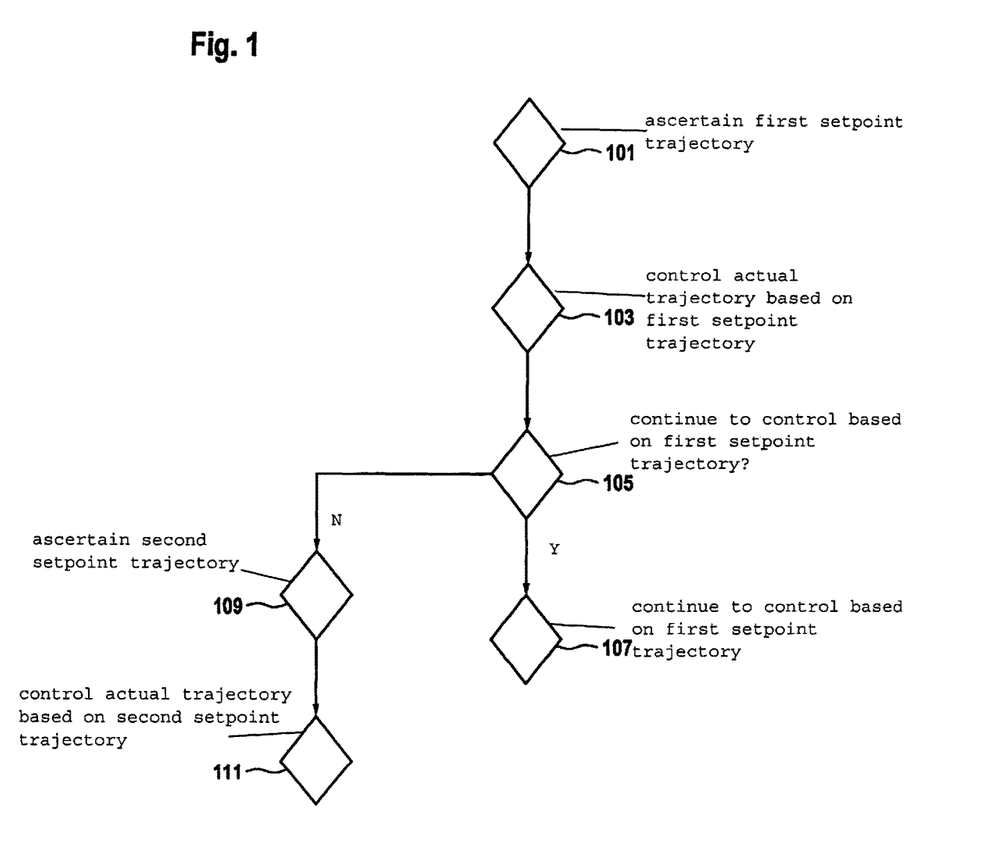
FIG. 1 shows a flowchart of a method for operating a vehicle.

FIG. 1 shows a flowchart of a method for operating a vehicle.

In a step 101, a first setpoint trajectory is ascertained at a first point in time. This in particular for a first cycle, thus, especially a first control cycle. In a step 103, an actual trajectory of the vehicle is controlled based on the first setpoint trajectory.

In a step 105, at a second point in time (particularly for a second cycle, thus especially for a second control cycle), which is subsequent to the first point in time, it is checked whether or not the actual trajectory of the vehicle may continue to be controlled based on the first setpoint trajectory. If it was determined in step 105 that the first setpoint trajectory may continue to be used as basis for controlling the actual trajectory of the vehicle, then in step 107, the actual trajectory of the vehicle continues to be controlled based on the first setpoint trajectory.

If it was determined in step 105 that the actual trajectory of the vehicle may no longer be controlled based on the first setpoint trajectory, then in a step 109, a second setpoint trajectory is ascertained, based on which, the actual trajectory of the vehicle is controlled in a step 111.

Figure 2:
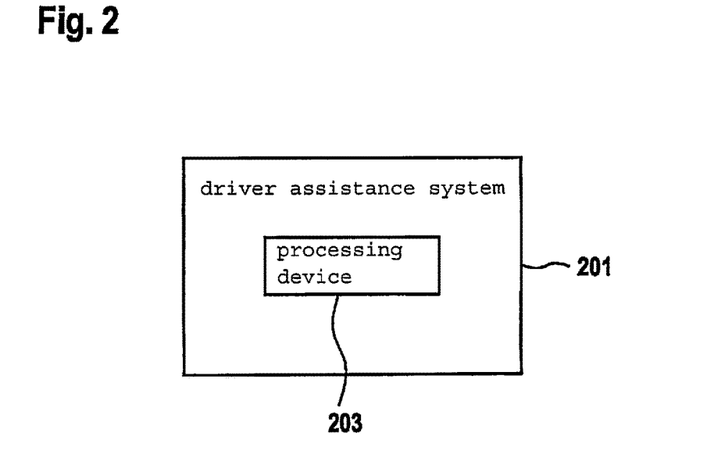
FIG. 2 shows a driver assistance system for a vehicle.

FIG. 2 shows a driver assistance system 201 for a vehicle (not shown).

Driver assistance system 201 includes a processing device 203, e.g., a computer. Processing device 203 is equipped to carry out the method for operating a vehicle.

Figure 3:
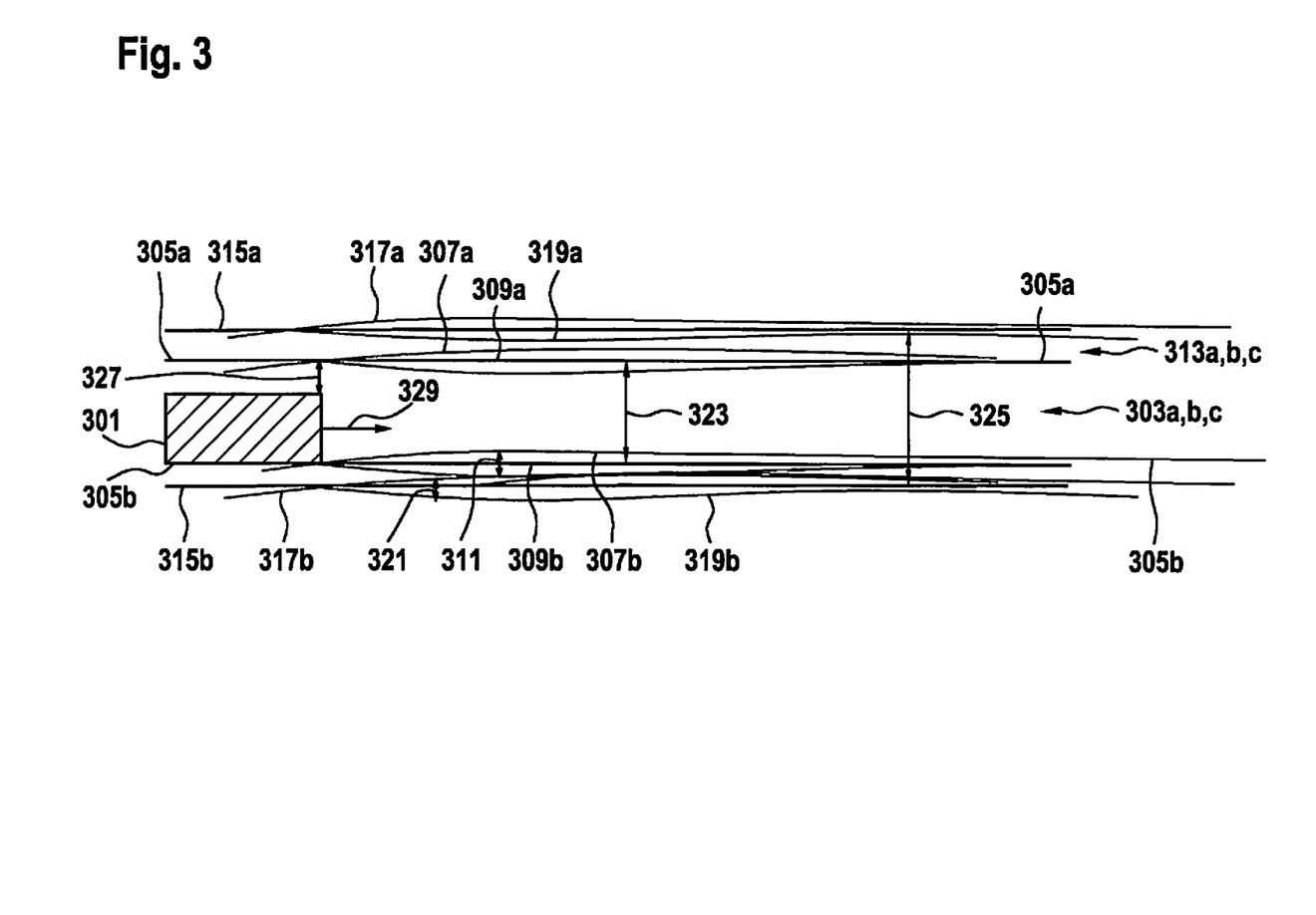
FIG. 3 shows a vehicle in a driving corridor.

FIG. 3 shows a vehicle 301 in driving corridors 303*a*, *b*, *c*, these driving corridors having been established at different points in time. Driving corridors 303*a*, *b*, *c* are each bounded symbolically by boundaries having reference numerals 305*a* and 305*b* or boundaries 307*a,b* and 309*a,b*. In the ideal case, boundaries 305*a,b* and 307*a,b* and 309*a,b* should merge seamlessly, thus continuously, into one another. Because of a sensor noise in sensing the driving corridor, generally, the driving corridor also exhibits noise with its boundaries. This is represented symbolically in FIG. 3, in so far as individual boundaries 305*a,b* (for driving corridor 303*a*) and 307*a,b* (for driving corridor 303*b*) and 309*a,b* (for driving corridor 303*c*) are drawn so as to be displaced relative to each other. A double arrow with reference numeral 311 symbolically denotes the noise. The length of the double arrow having reference numeral 311 corresponds in this respect to a noise amplitude.

In addition, further driving corridors 313*a*, *b*, *c* are drawn in in FIG. 3, which were formed at those points in time at which driving corridors 303*a*, *b*, *c* were also formed (same first point in time for driving corridors 303*a* and 313*a*, same second point in time for driving corridors 303*b* and 313*b* and same third point in time for driving corridors 303*c* and 313*c*). Analogous to driving corridors 303*a*, *b*, *c*, the various driving corridors 313*a*, *b*, *c* are also each bounded by boundaries 315*a,b* and 317*a,b* and 319*a,b*. Further driving corridors 313*a*, *b*, *c* in each case encompass driving corridors 303*a*, *b*, *c*. That means in particular that driving corridors 303*a*, *b*, *c* are thus located within further driving corridors 313*a*, *b*, *c*. Thus, for example, further driving corridors 313*a*, *b*, *c* may each define a driving corridor whose boundaries must not be crossed, since otherwise an accident may occur. This is especially so when stationary obstacles are located outside of further driving corridors 313*a*, *b*, *c*.

Driving corridors 303*a*, *b*, *c* may each define a driving corridor whose boundaries may be crossed in case of an emergency. As a general rule, however, driving corridors 303*a*, *b*, *c* should not be left, for normally they are selected so as to ensure a maximum in riding comfort.

Boundaries 315*a,b* and 317*a,b* and 319*a,b* of further driving corridor 313 also exhibit noise at different times. This is marked here in analogous manner with a double arrow having reference numeral 321.

The double arrow having reference numeral 323 identifies a width of driving corridor 303*b*. The double arrow having reference numeral 325 identifies a width of further driving corridor 313*a*. The double arrow having reference numeral 327 identifies symbolically a degree of freedom of vehicle 301 in driving corridor 303*a*. This degree of freedom corresponds here to a maximum lateral distance of vehicle 301 from boundary 305*a*, without vehicle 301 leaving driving corridor 303*a*. Degree of freedom 327 thus corresponds to a maximum possible maneuver clearance of vehicle 301 in the lateral or transverse direction. This is specific to the direction of travel of the vehicle, which is identified here symbolically with an arrow having reference numeral 329.

Figure 4:
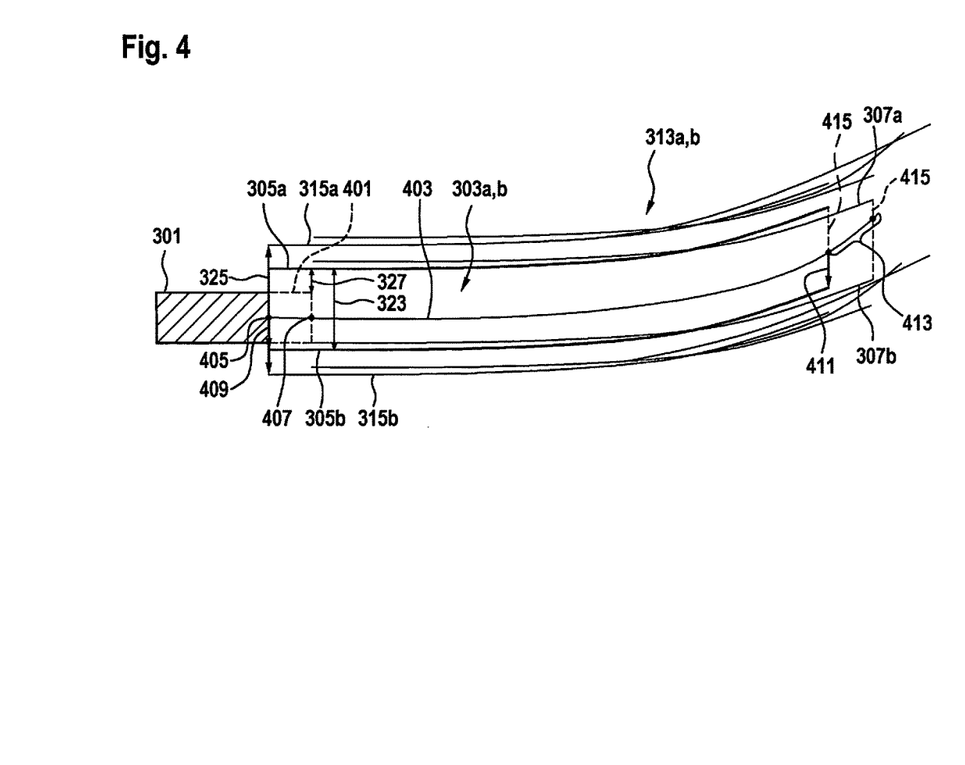
FIG. 4 shows a vehicle in a driving corridor, where the first setpoint trajectory may continue to be used for controlling the actual trajectory.

FIG. 4 shows vehicle 301 in driving corridor 303*a* at a first point in time at a first position 405, and at a second point in time in driving corridor 303*b* at a second position 407. The boundaries of driving corridor 303*a* at the first point in time are boundaries 305*a* and 305*b*. The boundaries of driving corridor 303*b* at the second point in time, therefore when the vehicle is at position 407, are boundaries 307*a* and 307*b*. Vehicle 301 is denoted with reference numeral 401 when it is located at position 407 at the second point in time.

A first setpoint trajectory, which was ascertained at the first point in time, is marked with reference numeral 403. A distance of position 405, which lies on first setpoint trajectory 403, from boundary 305*b* is identified with a single arrow having reference numeral 409. A corresponding distance of setpoint trajectory 403 at the lengthwise end of driving corridor 303*a* at the first point in time is identified with an arrow having reference numeral 411. The lengthwise end of driving corridor 303*a* at the first point in time (and also the lengthwise end of driving corridor 303*b* at the second point in time) is drawn in here with the aid of a broken line having reference numeral 415.

Reference numeral 413 denotes an extended section of first setpoint trajectory 403 in the direction of lengthwise end 415 of driving corridor 303*b* at the second point in time. Notably, this extension is possible, since first setpoint trajectory 403 may be described with the aid of an analytical function.

As FIG. 4 shows, extended first setpoint trajectory 403 is completely within driving corridor 303 at the second point in time. In particular, that means that recalculation of a setpoint trajectory (thus, calculation of a second setpoint trajectory) therefore does not have to be carried out at the second point in time. In other words, in particular, the actual trajectory of the vehicle may therefore continue to be controlled based on extended first setpoint trajectory 403.

Figure 5:
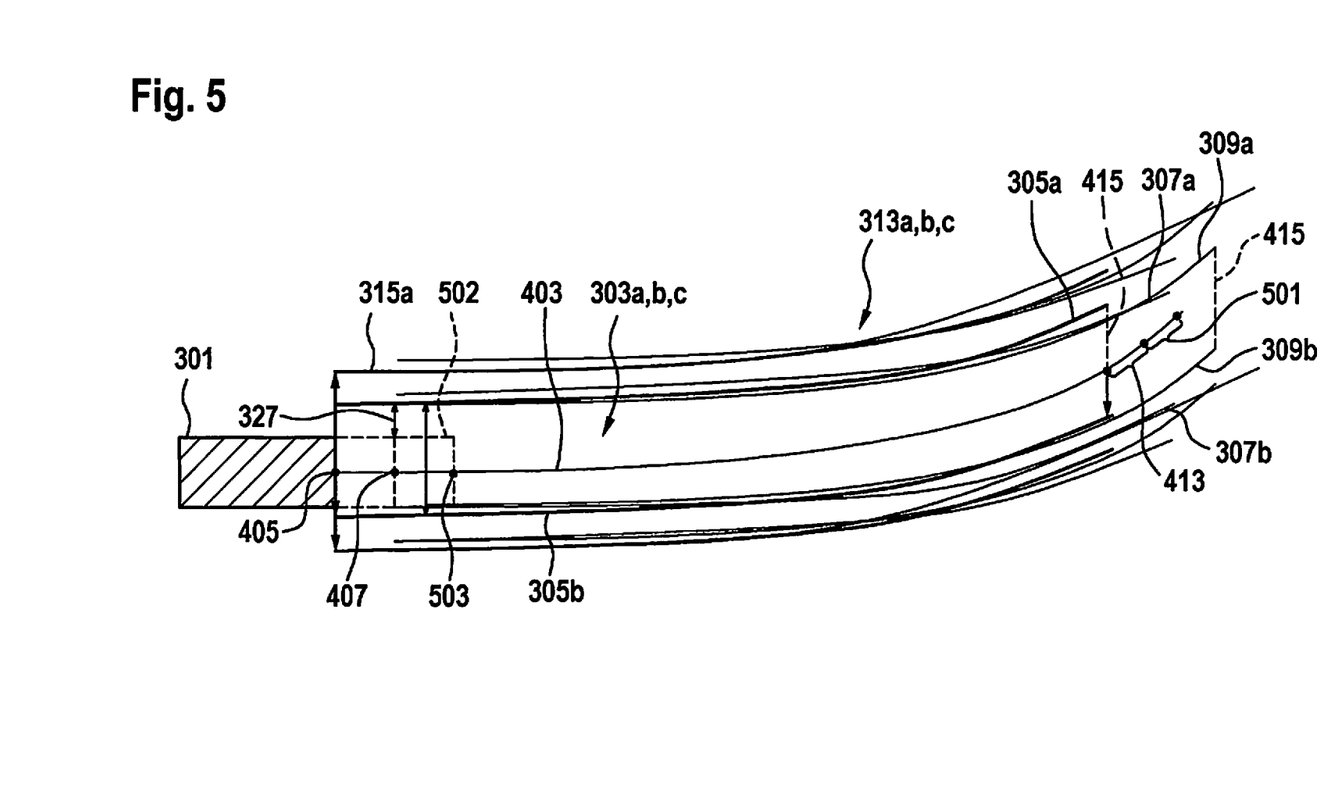
FIG. 5 shows a vehicle in a driving corridor, a second setpoint trajectory having to be calculated for the further control of the actual trajectory.

FIG. 5 now shows an example in which a setpoint trajectory must be recalculated. The vehicle now finds itself at the third point in time, which is subsequent to the second point in time, at a position 503 in driving corridor 303c having boundaries 309a,b. At position 503, the vehicle is marked by reference numeral 502. The setpoint trajectory extended according to FIG. 4 is extended here as well to the lengthwise end of third driving corridor 303c. The extended section is identified by reference numeral 501. Here, it lies partially outside of driving corridor 303c, which was determined at the third point in time. That is to say, the setpoint trajectory used up to now may no longer be used to control the actual trajectory for third driving corridor 303c. A new setpoint trajectory, thus, a second setpoint trajectory, must be calculated for third driving corridor 303c.

Figure 6:
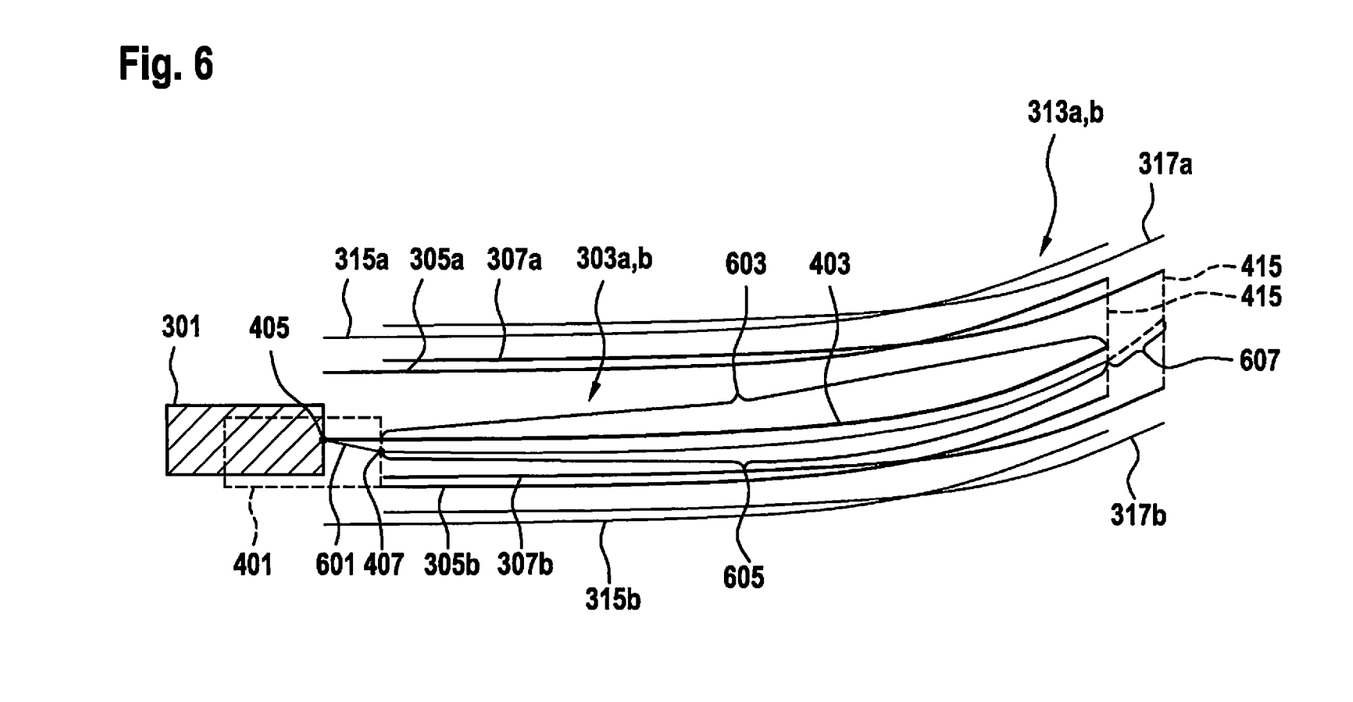
FIG. 6 shows a vehicle in a driving corridor at two different points in time, the vehicle not being located on the first setpoint trajectory at the later point in time.

FIG. 6 shows vehicle 301 at position 405 in driving corridor 303a at a first point in time and at position 407 in driving corridor 303b at a second point in time. In comparison to FIGS. 4 and 5, position 407 here is set apart laterally with respect to first setpoint trajectory 403. The trajectory of vehicle 301 already covered is identified by reference numeral 601. Thus, a remaining setpoint trajectory is left, which is identified by reference numeral 603. This remaining setpoint trajectory 603 is linked with the position of the vehicle at the second point in time, thus, with position 407. The linked remaining setpoint trajectory is identified by reference numeral 605. The extended section of linked remaining setpoint trajectory 605 to lengthwise end 415 of corridor 303b at the second point in time is denoted by reference numeral 607. Here, as well, this linked extended remaining setpoint trajectory lies within the driving corridor at the second point in time, thus, with respect to the second driving corridor. A new setpoint trajectory does not have to be used for second driving corridor 303b. The linked extended remaining setpoint trajectory is used for controlling the actual trajectory. This especially up to a third point in time, at which a third driving corridor is ascertained. At the third point in time, it is then checked whether the linked extended remaining setpoint trajectory may also be used to control the actual trajectory within the third driving corridor.

Figure 7:
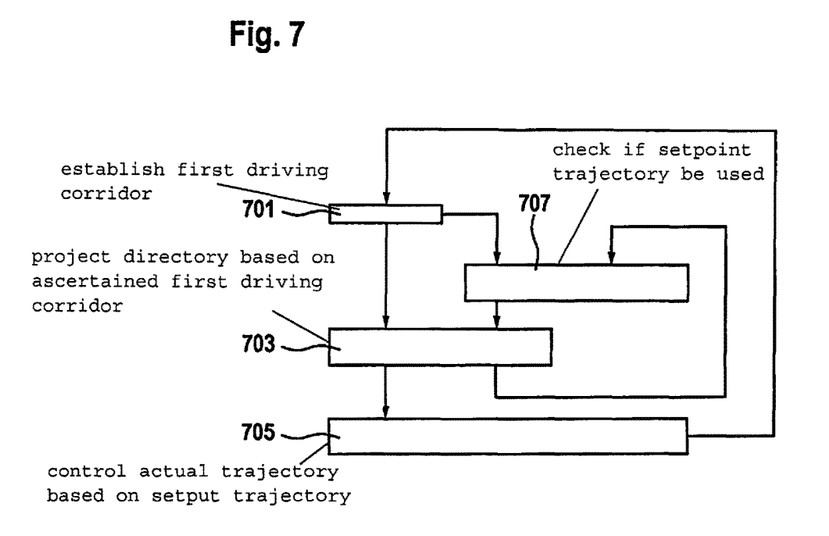
FIG. 7 shows a flowchart of a further method for operating a vehicle.

FIG. 7 shows a flowchart of a further method for operating a vehicle.

According to a step 701, a first driving corridor is established. According to a step 703, a trajectory is projected based on the ascertained driving corridor. In particular, that is to say that in step 703, a first setpoint trajectory is therefore determined which is located within the first driving corridor. According to a step 705, an actual trajectory is controlled based on the first setpoint trajectory. In this context, it is provided that driving corridors are ascertained cyclically according to step 701, it being checked in a step 707 whether the setpoint trajectory according to step 703 determined in the previous cycle may be used for the present cycle. If this is the case, then this setpoint trajectory of the previous cycle is used as basis for the motion control, thus, for controlling the actual trajectory to the setpoint trajectory. Otherwise, a new setpoint trajectory is calculated.

Figure 8:
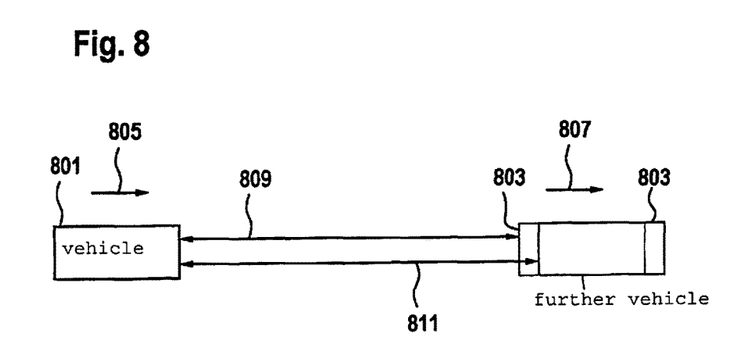
FIG. 8 shows a vehicle and a vehicle preceding the vehicle.

FIG. 8 shows a vehicle 801 which is preceded by a further vehicle 803. Vehicle 801 is traveling with a speed that is represented symbolically by an arrow having reference numeral 805. In analogous manner, the arrow having reference numeral 807 symbolically denotes a speed of further vehicle 803.

If the intention is to control to a constant distance between vehicle 801 and further vehicle 803 by guidance of vehicle 801, then a noise in the signal when sensing the distance (thus, e.g., a noise in a sensor signal) should not lead to an uncomfortable longitudinal control, i.e., in the direction of travel. Reference numeral 809 points here to a double arrow between vehicle 801 and further vehicle 803, which corresponds to a distance between the two vehicles 801 and 803 measured at a first point in time or in a first cycle. Correspondingly, reference numeral 811 points to a double arrow that identifies a measured distance between the two vehicles 801 and 803 measured at a subsequent second point in time or cycle. Because of a noise of a sensor that measures the distance, for example, a different distance measurement may therefore occur. This is so, even though the two vehicles 801 and 803 are traveling with the same speed. However, in order that this does not automatically lead to a new trajectory projection (thus, a calculation of a second setpoint trajectory), in particular, it may be provided that a second setpoint trajectory is calculated at the second point in time only when a deviation of the actual distance from the setpoint distance between the two vehicles 801 and 803 is less, especially less than or equal to, a predetermined deviation threshold value.

In particular, that is to say that in the case of a longitudinal guidance, analogous to the example for the lateral guidance, a new setpoint trajectory is not projected until a defined degree of freedom, here, especially the deviation threshold value, is exceeded. So long as this is not the case, the actual trajectory of the vehicle continues to be controlled based on the originally projected setpoint trajectory, thus, the first setpoint trajectory.

Therefore, the present invention expressly includes projecting or calculating a new setpoint trajectory only when a predetermined or predefined degree of freedom has been exceeded. This advantageously results in an insensitivity of a vehicle movement to a noise in the driving corridor and/or a sensor noise. In particular, this means that a possibility is thus provided to bring about a comfortable movement even when working with a poor sensor system.

A further result is that, nevertheless, it is possible to react to a rapid change. This is in contrast to when the input signals of sensors, which, for example, measure a distance between the vehicle and a further vehicle or an obstacle or any object, or which sense a vehicle environment using sensory means, would be filtered to eliminate the noise, for this would impair a dynamic response of a functional reactivity. However, in contrast to that, the present invention has no bad influence on a good reaction to rapid changes. Thus, in particular, the remainder of the old setpoint trajectory (which was calculated or ascertained at the first point in time) is linked to the instantaneous location and direction of the vehicle, and it is checked whether an extended, linked remaining setpoint trajectory continues to be within the driving corridor that was calculated at the second point in time.

What is claimed is:

1. A method for operating a vehicle, comprising:
   ascertaining, at a first point in time, a first setpoint trajectory, and controlling an actual trajectory of the vehicle based on the first setpoint trajectory;
   determining, at a second point in time subsequent to the first point in time, a remaining setpoint trajectory which corresponds to the first setpoint trajectory minus a section of the first setpoint trajectory already used for controlling the actual trajectory at the second point, a driving corridor being established at the second point in time, the driving corridor having a predetermined length, the first setpoint trajectory being described with the aid of an analytical function, so that the remaining setpoint trajectory is extended based on the analytical function up to a lengthwise end of the driving corridor;

checking, at the second point in time, whether or not the extended remaining setpoint trajectory of the vehicle is completely within the driving corridor; and continuing to control the actual trajectory of the vehicle based on the extended remaining setpoint trajectory based on results of the checking step.

2. The method as recited in claim 1, wherein the remaining setpoint trajectory is a trajectory from a position of the vehicle at or after the second point in time.

3. The method as recited in claim 1, wherein the control of the actual trajectory includes at least one of a longitudinal control of a vehicle movement, and a lateral control of the vehicle movement.

4. The method as recited in claim 3, wherein to control an actual distance between the vehicle and a preceding vehicle to a setpoint distance between the vehicle and the preceding vehicle, the first setpoint trajectory is used for longitudinal control of the vehicle movement depending on a deviation of the actual distance from the setpoint distance.

5. A computer program product having program code stored on a non-transitory machine-readable storage medium, the program code for operating a vehicle, the program code, when executed by a processing device, causing the processing device to perform:

ascertaining, at a first point in time, a first setpoint trajectory, and controlling an actual trajectory of the vehicle based on the first setpoint trajectory;

determining, at a second point in time subsequent to the first point in time, a remaining setpoint trajectory which corresponds to the first setpoint trajectory minus a section of the first setpoint trajectory already used for controlling the actual trajectory at the second point, a driving corridor being established at the second point in time, the driving corridor having a predetermined length, the first setpoint trajectory being described with the aid of an analytical function, so that the first remaining setpoint trajectory is extended based on the analytical function up to a lengthwise end of the driving corridor;

checking, at the second point in time, whether or not the extended remaining setpoint trajectory of the vehicle is completely within the driving corridor;

continuing to control the actual trajectory of the vehicle based on the extended remaining setpoint trajectory if the extended remaining trajectory is completely within the driving corridor; and ascertaining a second setpoint trajectory and controlling the actual trajectory of the vehicle based on the second setpoint trajectory if the extended remaining trajectory is not completely within the driving corridor.

6. A driver assistance system for a vehicle, comprising:

a processing device configured to:

ascertain, at a first point in time, a first setpoint trajectory, and control an actual trajectory of the vehicle based on the first setpoint trajectory;

determine, at a second point in time subsequent to the first point in time, a remaining setpoint trajectory which corresponds to the first setpoint trajectory minus a section of the first setpoint trajectory already used for controlling the actual trajectory at the second point, a driving corridor being established at the second point in time, the driving corridor having a predetermined length, the first setpoint trajectory being described with the aid of an analytical function, so that the first remaining setpoint trajectory is extended based on the analytical function up to a lengthwise end of the driving corridor;

check, at the second point in time, whether or not the extended remaining trajectory of the vehicle is completely within the driving corridor;

continue to control the actual trajectory of the vehicle based on the extended remaining setpoint trajectory if the extended remaining setpoint trajectory is completely within the driving corridor; and ascertain a second setpoint trajectory and control the actual trajectory of the vehicle based on the second setpoint trajectory if the extended remaining setpoint trajectory is not completely within the driving corridor.

7. The driver assistance system as recited in claim 6, wherein the driver assistance system is a traffic-jam assistance system.

* * * * *